United States Patent
Oh

(10) Patent No.: US 12,022,159 B2
(45) Date of Patent: Jun. 25, 2024

(54) METHOD AND SYSTEM FOR PROVIDING SUPPORT SERVICE THAT PROVIDES VOICE SUPPORT USING ONLINE VOTING FUNCTION

(71) Applicant: THIS CAT LC., Gwangju (KR)

(72) Inventor: Joo Hwan Oh, Ulsan (KR)

(73) Assignee: THIS CAT LC., Gwangju (KR)

( * ) Notice: Subject to any disclaimer, the term of this patent is extended or adjusted under 35 U.S.C. 154(b) by 0 days.

(21) Appl. No.: 18/367,053

(22) Filed: Sep. 12, 2023

(65) Prior Publication Data

US 2023/0421856 A1   Dec. 28, 2023

Related U.S. Application Data

(63) Continuation of application No. PCT/KR2022/004795, filed on Apr. 4, 2022.

(30) Foreign Application Priority Data

Apr. 17, 2021   (KR) .................... 10-2021-0050180

(51) Int. Cl.
*H04N 7/173* (2011.01)
*H04N 21/472* (2011.01)
*H04N 21/475* (2011.01)

(52) U.S. Cl.
CPC ... *H04N 21/4758* (2013.01); *H04N 21/47217* (2013.01)

(58) Field of Classification Search
CPC ............ H04N 21/4758; H04N 21/47217
USPC .................................................. 725/24
See application file for complete search history.

(56) References Cited

U.S. PATENT DOCUMENTS

| | | | | |
|---|---|---|---|---|
| 10,277,932 B2* | 4/2019 | Gaffrey | ............ | H04N 21/2187 |
| 10,339,823 B2* | 7/2019 | Bak | ............ | G06F 16/3322 |
| 11,093,120 B1* | 8/2021 | Paul | ............ | G06F 3/0484 |
| 11,558,580 B1* | 1/2023 | Stewart | ............ | H04N 21/4758 |
| 2005/0089826 A1* | 4/2005 | Hidesawa | ............ | G09B 7/00 434/118 |

(Continued)

FOREIGN PATENT DOCUMENTS

| | | |
|---|---|---|
| JP | 2003-046982 A | 2/2003 |
| KR | 10-2020-0037721 A | 4/2020 |

*Primary Examiner* — Jefferey F Harold
*Assistant Examiner* — Sahar Aqil Riaz
(74) *Attorney, Agent, or Firm* — Bridgeway IP Law Group, PLLC; Sang Ho Lee; Hyun Woo Shin

(57) ABSTRACT

Provided is a method and system for providing a support service, which includes: a process of displaying a first menu, through which it is possible to search for and select an object of support, on user terminals; a process of displaying a second menu, through which it is possible to search for a support phrase or a support song that can be used for the object of support selected from the first menu, on the user terminals; a process of creating user support files obtained by recording the support phrase or the support song, which is selected by searching the second menu, in the voice of users and transmitting the user support files through a communication network; and a process of transmitting results of voting a support phrase or a support song, which the users want to be output at an actual support site where a game or a performance of the object of support is performed, by searching for the second menu through the communication network.

10 Claims, 4 Drawing Sheets

(56) References Cited

U.S. PATENT DOCUMENTS

2020/0053319 A1* 2/2020 Kawakami .......... H04N 21/812

* cited by examiner

METHOD AND SYSTEM FOR PROVIDING SUPPORT SERVICE THAT PROVIDES VOICE SUPPORT USING ONLINE VOTING FUNCTION

CROSS-REFERENCE TO RELATED APPLICATIONS

The present application is a continuation application of PCT International Patent Application No. PCT/KR2022/004795 filed Apr. 4, 2022, and claims priority under 35 U.S.C. § 365 and/or 35 U.S.C. § 119(a) to Korean Patent Application No. 10-2021-0050180 filed Apr. 17, 2021, the entire contents of which are hereby incorporated by reference.

BACKGROUND OF THE INVENTION

Field of the Invention

The present disclosure relates to a method and system for providing a support service, in more detail, a method and system for providing a support service, the method and system being able to provide an effect like giving support by means of a voice at a site even though a user is not actually at the support place.

Description of the Related Art

It is general to personally go and give support at the in order to support objects of support such as players or performers who they support in sports games, performances, etc. Recently, a method of giving support in real time using comments while watching streaming broadcast, a method of showing the faces of spectators at the site using a video conference solution, or the like used with the development of the information communication technology. However, there is limitation in transmitting support by spectators to players, performers, etc. such that they can vividly feel the support through these methods, and bad comments may be transmitted rather than support.

Further, as social distance, etc. are enforced, it has been limited to personally go and watch games or performances at sports stadiums or theaters and it is also limited for spectators to give support by means of sounds even they watch at the sites. Accordingly, the supporting sound by spectators was heard in running commentaries of sports games or performances in the past, but, now, such supporting sound is not heard in most cases, so liveliness decreases. In some pro sports, clubs use supporting sound sources of video games at their options or and use a small number of cheer leaders for on-site support, but, even in this case, the support effect is small, as compared with that spectators personally give support by making sounds at the site.

Accordingly, it is required to consider a service plan that can achieve an effect the same as giving support by sound at the site even though spectators do not personally go to a sports stadium, a theater, or the like.

SUMMARY OF THE INVENTION

An objective of the present disclosure is to provide to a method and system for providing a support service, the method and system being able to achieve an effect the same as giving support by sound at the site even though spectators are not actually at the support site.

A method of providing a support service according to the present disclosure for achieving the objectives may include: displaying a first menu, through which it is possible to search for and select an object of support, on user terminals; displaying a second menu, through which it is possible to search for a support phrase or a support song that can be used for the object of support selected from the first menu, on the user terminals; creating user support files obtained by recording the support phrase or the support song, which is selected by searching the second menu, in the voice of users and transmitting the user support files through a communication network; and transmitting results of voting a support phrase or a support song, which the users want to be output at an actual support site where a game or a performance of the object of support is performed, by searching for the second menu through the communication network.

Further, the method of providing a support service according to the present disclosure may further include totaling results of voting through the user terminals and determining a support phrase or a support song to be output at the actual support place on the basis of the totaled vote result by means of a management server connected with the user terminals through the communication network such that communication is possible.

Further, the method of providing a support service according to the present disclosure may further include: creating one integrated sound source file by mixing the user support files for each same support phrase or support song; and controlling an integrated sound source file corresponding to the determined support phrase or support song of the integrated sound source file to be played at the actual support place.

A system for providing a support service according to the present disclosure for achieving the objectives may include: user terminals displaying a first menu through which it is possible to search for and select an object of support and a second menu through which it is possible to search for a support phrase or a support song that can be used for the object of support selected from the first menu, creating user support files by recording the support phrase or the support song, which is selected by searching the second menu, in the voice of users, enabling the users to vote a support phrase or a support song, which the users want to be output at an actual support site where a game or a performance of the object of support is performed, by searching for the second menu; and a management server totaling results of voting through the user terminals determining a support phrase or a support song to be output at the actual support place on the basis of the totaled vote result.

Further, the system may further include an operation company server creating one integrated sound source file by mixing the user support files for each same support phrase or support song, wherein the management server may control an integrated sound source file corresponding to the determined support phrase or support song of the integrated sound source file to be played at the actual support place.

Further, in order to achieve the objectives, the present disclosure may provide a processor-readable recording medium on which a program for executing the method of providing a support service in a processor is recorded.

According to the present disclosure, a user can select and output a support phrase or support song recorded in advance in the voice of the user through a play system installed at an actual support place through an App that is executed in a user terminal even though he/she does not personally go to the actual support place such as a sports stadium or a theater. Accordingly, it is possible to achieve an effect like giving support by voice at a site even though spectators are not at a sports stadium or a theater. Further, since a support phrase or a support song that is output at an actual support place is determined in accordance with vote results by users, it is possible to induce users to participate in vote by making confrontation among the users, and sports clubs or performance promoters can make an additional business profit through relevant services.

DETAILED DESCRIPTION OF THE INVENTION

In this specification, It should be understood that, when it is described that a component is "connected to" or "accesses" another component, the component may be directly connected to or access the other component or a third component may be present therebetween. Other expressions describing the relationship of the components, that is, expressions such as "between" and "directly between" or "adjacent to" and any component "transmits" a signal to another component should also be similarly interpreted.

The present disclosure is described hereafter in detail with reference to the accompanying drawings.

Figure 1:
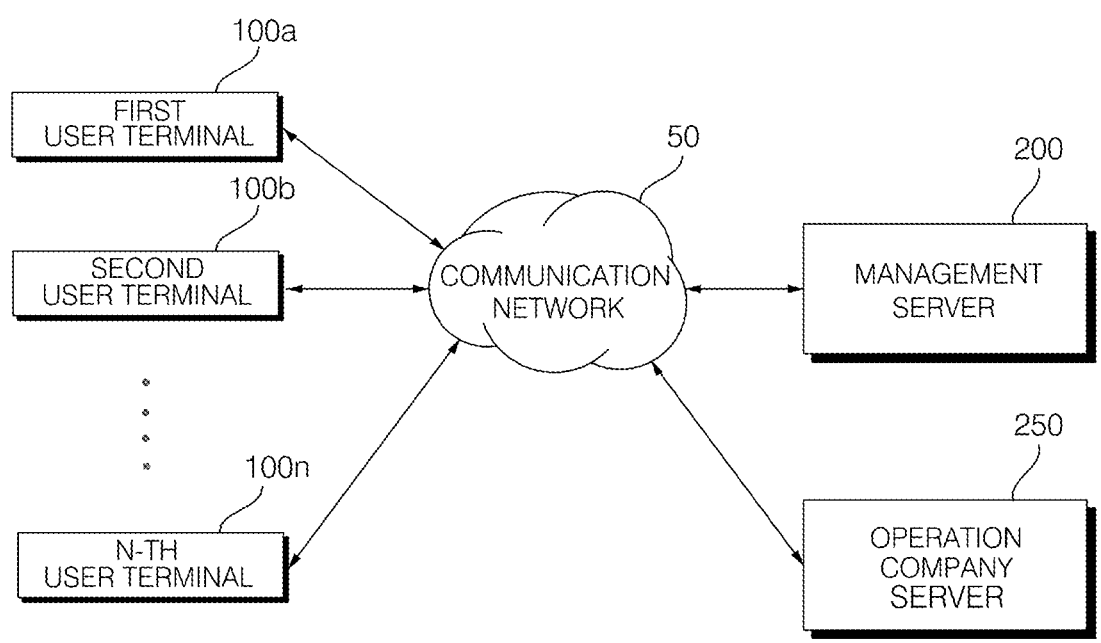
FIG. 1 is a view that is referred to for describing an example of a system to which a method of providing a support service according to the present disclosure is applied.

FIG. 1 is a view that is referred to for describing an example of a system to which a method of providing a support service according to the present disclosure is applied.

Referring to FIG. 1, first to n-th user terminals 100a~100n, a management server 200, and an operation company server 250 are connected to each other such that communication is possible through a communication network 50.

The communication network 50 means a network that enables communication between the first to n-th user terminals 100a~100n, the management server 200, and the operation company server 250, such as a mobile communication network, the internet, or a combination network thereof.

The first to n-th user terminals 100a~100n, which are terminals of users who use a support service, include all electronic devices that can communicate with other devices through the communication network 50 such as not only a common personal computer (PC), but also a smart phone, a notebook computer, and a tablet computer.

The users can select objects of support that the users want to support, such as a sports club, a player, or a performer, select a support phrase or a support song to be used for the selected object of support, and create a user support file by recording the selected support phrase or supporting song using their voices through the first to n-th user terminals 100a~100n. Further, the users can vote a support phrase or a support song that they want to be output at the actual site where a sports game or a performance is performed while watching the sports game or the performance.

The management server 200 can determine a support phrase or support song to be output at the actual site by totaling the vote results transmitted from the first to n-th user terminals 100a~100n.

The operator company server 250 can receive user support files corresponding to the support phrase or the support song determined by the management server 200, create one integrated sound source file by mixing the use support files for each same support phrase or support song, and set conditions, methods, etc. for the vote that is performed through the first to n-th user terminals 100a~100n.

According to this configuration, it is possible to achieve an effect like supporting with a voice at a site even though a user does not personally go to a sports stadium or a theater.

Figure 2:
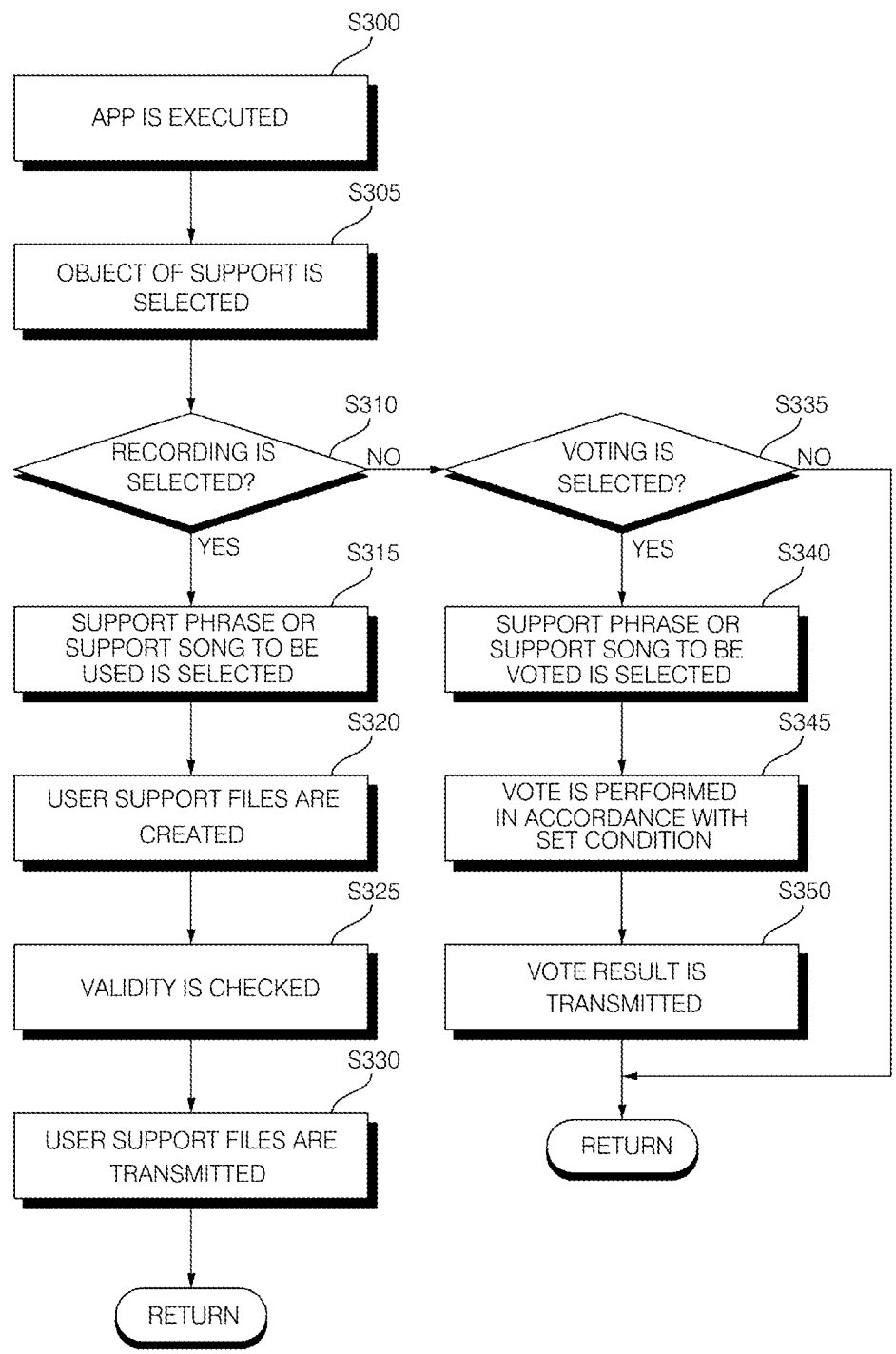
FIGS. 2 to 4 are flowcharts provided to describe the method of providing a support service according to an embodiment of the present disclosure.
Figure 3:
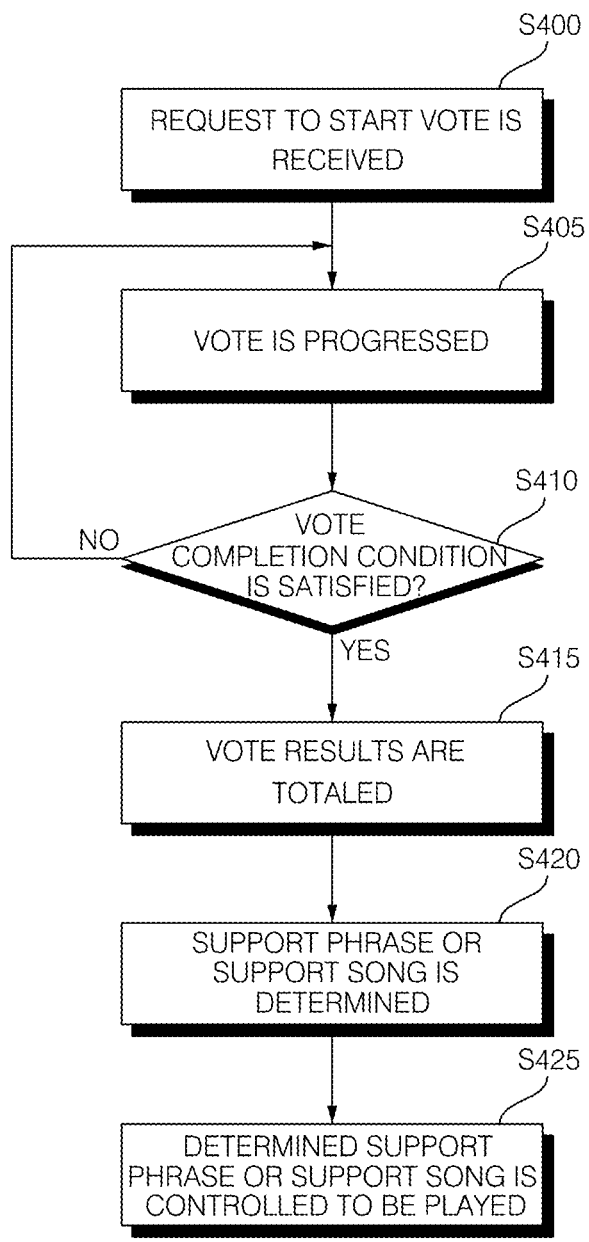
Figure 4:
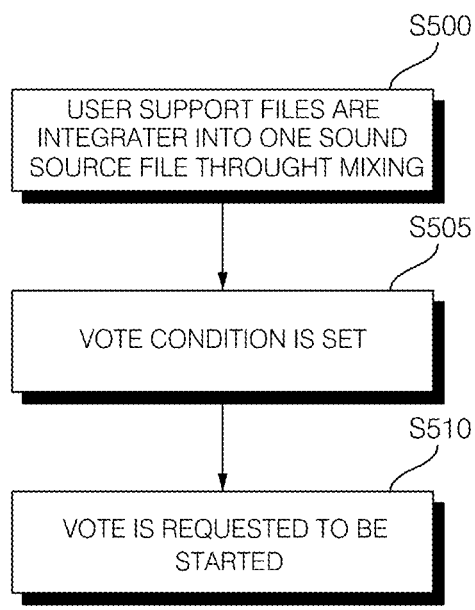

FIGS. 2 to 4 are flowcharts provided to describe the method of providing a support service according to an embodiment of the present disclosure.

FIG. 2 is a flowchart provided to describe an operation process in a user terminal.

Referring to FIG. 1, first, an App for using a support service is executed in a user terminal 100 (S300). A login image may be displayed when the App is executed, and when the login image is displayed, a user can log in by inputting an ID and a password. If it is first time for a user to use a service, a service subscription process such as setting an ID and a password, etc. may be performed first.

When the App is executed, a menu through which it is possible to search and select objects of support such as sport clubs, players, performers, etc. is displayed on the user terminal 100 and the user can select an object of support through the menu (S305).

Next, when selecting a record menu (S310), the user selects a support phrase or a support song to use for recording through a menu through which it is possible to search support phrases or support songs that can be used for the selected object of support (S315). Further, a user support file obtained by recording the selected support phrase or support song using the voice of the user is created (S320).

Further, validity of the user support file is checked (S325). That is, whether the user support file has been validly created through the App is checked. When other contents, slanders, or the like are recorded other than a support phrase or a support song, it is possible to make the user create again a user support file or to prevent transmission of the user support file through the examination of validity of the user support file.

When validity examination is finished, the created user support file is transmitted (S325). The user support file may be transmitted to the operation company server 250 or may be transmitted to the management server 200, depending on the use environment.

After step S305, when selecting a vote menu (S335), the user can select a support phrase or a support song that he/she wants to output at the actual site where the game or the performance that is the selected object of support is performed by searching support phrases or support songs through a menu through which it is possible to search support phrases or support songs.

Further, a vote process is performed in accordance with conditions set in advance for the selected support phrase or support song (S345). The operation company server 250 or the management server 200 can set vote conditions, whether to start a vote, the number of times of vote for each user, etc. This vote process can be performed in real time while the user watches the sports game or the performance Displaying, performing, or the like of a menu related to the vote process may be performed in accordance with control by the management server 200 or may be activated through a process of synchronizing with the operation company server 250, etc.

When the vote is finished, the vote result is transmitted to the management server 200 (S350).

Meanwhile, the number of times of vote may be differently set, depending on the level of users, in the vote process, and the levels of users may be set on the basis of various references such as the degree of participation of the users or the fee that the users have paid. For example, it is possible to allow a free user to vote only preset n times, allow a user who has made a user support file to vote n+2 times by designating the user as a VIP user, and allow a paid user to vote n+3 times. It is possible to progress a vote in accordance with various other manners and conditions.

FIG. 3 is a flowchart provided to describe an operation process in a management server. Referring to FIG. 3, when receiving a request to start a vote from the operation company server 250, the management server 200 makes a vote be progressed in the user terminal 100 in accordance with a vote condition set in the operation company server 250, etc. (S405).

The management server 200 makes the vote process be performed in the user terminal 200 until a vote completion condition set in the operation company server 250 is satisfied (S410). In this case, the vote completion conditions may be variously set. For example, it may be possible to select a support phrase or a support song that polled the largest number of votes for a preset time and it may be possible to select a support phrase or a support song that firstly polled a pre-designated number of votes.

When the set vote completion condition is satisfied (S4100, the management server 200 totals the vote results (S415) and determines a support phrase or a support song to be output at the actual site in accordance with the totaled result (S420).

Further, the determined support phrase or support song is controlled to be played (S425). The management server 200 receives and stores an integrated sound source file integrated by mixing user support files for each same support phrase or support song from the operation company server 250. Further, an integrated sound source file corresponding to the determined support phrase or support song of integrated sound source files may be transmitted to a play system, which is installed at the actual site where a game or a performance is being performed, to be played.

Depending on use environments, it may be possible to transmit information about a determined support phrase or support song to the operation company server 250 such that a corresponding integrated sound source file is transmitted to a play system, which is installed at a site, from the operation company server 250 to be played.

FIG. 4 is a flowchart provided to describe a process that is performed in an operation company server.

Referring to FIG. 4, the operation company server 250 integrate user support files received from the user terminal 100 or the management server 200 into one sound source file by mixing the user support files for each same support phrase or support song (S500).

The integrated sound source file may be transmitted to the management server 200 to be managed or may be managed by the operation company server 250.

The operation company server 250 can set a vote condition, etc. (S505) and can request the management server 200 to start a vote together with the set vote condition (S510).

If the integrated sound source file is managed by the operation company server 250, the operation company server 250 can receive vote results from the management server 200 and can control an integrated sound source file, which corresponds to a determined support phrase or support song, to be output through a play system installed at an actual site where a game or a performance is being performed.

According to this process, it is possible to output a support phrase or a support song recorded in a user's voice in accordance with vote results, so it is possible to achieve an effect like spectators give support at an actual site. Further, it is possible to achieve an effect like many people simultaneously give support by integrating user support files into one sound source file and playing the integrated sound source file.

Further, since a support phrase or a support song that is output at an actual site is determined in accordance with vote results, it is possible to induce users to participate in vote by making confrontation among the users. For example, in a sports game, it is possible to induce users to compete each other in order to output the support phrases or support songs for teams that the support by allowing for simultaneous access of not only the users for a home team, but the users for an away team.

Meanwhile, the present invention may not be limitedly applied to the configurations of the exemplary embodiments described as above, but the exemplary embodiments may be configured by selectively combining all or some of the respective embodiments so as to be variously modified.

Further, it is possible to accomplish the present disclosure into hardware, a computer program that is executed by a processor, firmware, or a combination thereof. The computer program may be implemented on a computer-readable medium such as a storage medium. The computer-readable medium, for example, may be a ROM, a RAM, an EPROM, an EEPROM, a register, a hard disk, a separable disc, a CD-ROM, or any other-type storage medium well known in the art. The storage medium may be connected to a processor so that the processor can read out information from the storage medium and record information on the storage medium. The storage medium may be integrated into a processor. The processor and the storage medium may be always in an application specific integrated circuit (ASIC). Alternatively, the processor and the storage medium may exist as individual components.

Further, although the exemplary embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. A method of providing a support service, the method comprising:
   connecting user terminals, a management server, and an operation company server through a communication network such that communication is possible;
   selecting an object of support through an App executed in the user terminals and selecting a support phrase or a support song for the selected object of support;
   creating user support files by recording the support phrase or the support song through the user terminals;
   checking validity of the user support files through the App, transmitting the user support files through the communication network when the validity check is passed, and preventing transmission of the user support files when the validity check fails;

transmitting voting results of the support phrase or the support song that the users chooses to be output at an actual support place, where a game or a performance that is the object of support is performed, through the communication network in accordance with a preset condition in the user terminals;

totaling results of voting through the user terminal and determining the support phrase or the support song to be output at the actual support place on a basis of the totaled vote results by through the management server; and creating one integrated sound source file by mixing the user support files corresponding to each of the support phrase or the support song, and controlling an integrated sound source file corresponding to the support phrase or the support song of the integrated sound source file to be played at the actual support place in accordance with the determination result by the management server, through the operation company server.

2. The method of claim 1, further comprising setting a voting condition in the user terminals by an operation company server.

3. The method of claim 1, wherein the number of time for vote through the user terminals is differently set in accordance with levels given to the users.

4. The method of claim 1, wherein levels given to the users are changed in accordance with fees that the users have paid or whether the user support files are created.

5. A non-transitory processor-readable recording medium on which a program for executing the method of providing a support service of claim 1 in a processor is recorded.

6. A non-transitory processor-readable recording medium on which a program for executing the method of providing a support service of claim 2 in a processor is recorded.

7. A non-transitory processor-readable recording medium on which a program for executing the method of providing a support service of claim 3 in a processor is recorded.

8. A non-transitory processor-readable recording medium on which a program for executing the method of providing a support service of claim 4 in a processor is recorded.

9. A system for providing a support service, the system comprising:

user terminals that select an object of support by executing an App, select a support phrase or a support song for the selected object of support, create user support files by recording the selected support phrase or the support song in the voice of users, check validity of the user support files through the App, transmit the user support files through a communication network when the validity check is passed, prevent transmission of the user support files when the validity check fails, and vote the support phrase or the support song that the users chooses to be output at an actual support place, where a game or a performance that is the object of support is performed, on a basis of a preset condition;

a management server that is connected with the user terminals through the communication network, totals results of voting through the user terminals, and determines the support phrase or the support song to be output at the actual support place on a basis of the totaled vote result; and an operation company server that is connected with the user terminals and the management server through the communication network, creates one integrated sound source file by mixing the user support files corresponding to each of the support phrase or the support song, and controls an integrated file corresponding to the support phrase or the support song of the integrated support file to be output at the actual support plate.

10. The system of claim 9, wherein the operation company server sets a voting condition through the user terminals.

* * * * *